Oct. 7, 1969 J. P. PAWLETKO 3,471,832

CHARACTER RECOGNITION APPARATUS

Filed July 6, 1965 3 Sheets-Sheet 1

INVENTOR
JOSEPH P. PAWLETKO

BY John C Black
ATTORNEY

Oct. 7, 1969 J. P. PAWLETKO 3,471,832

CHARACTER RECOGNITION APPARATUS

Filed July 6, 1965 3 Sheets-Sheet

United States Patent Office 3,471,832
Patented Oct. 7, 1969

3,471,832
CHARACTER RECOGNITION APPARATUS

Joseph P. Pawletko, Endwell, N.Y., assignor to International Business Machines Corporation, Armonk, N.Y., a corporation of New York Filed July 6, 1965, Ser. No. 469,499
Int. Cl. G06k 9/02
U.S. Cl. 340—146.3 11 Claims

ABSTRACT OF THE DISCLOSURE

In character recognition apparatus, a series of signals corresponding to incremental portions of one character are delayed for a predetermined interval prior to amplification to permit an improved linear integrator and transfer circuit to produce a control voltage as a function of the series of signals and to permit an improved variable gain amplifier to be set to a gain level as an inverse linear function of the control voltage. All signals in the series are amplified at the same gain level with minimum phase or reference level shift.

This application relates generally to optical and magnetic character recognition apparatus and more particularly to an improved variable gain amplifying means for compressing the minimum to maximum amplitude ratios of signals produced during the scanning of data.

During the scanning of data by both optical and magnetic character recognition apparatus, the quality of the printed data, as well as the quality of the document upon which the data is recorded, gives rise to data signals which vary greatly in amplitude.

The improved circuits of the present application have been particularly adapted for use in apparatus of the type in which a magnetic read head scans data printed in the form of magnetic ink characters; it will be appreciated, however, that the invention is not to be limited thereto, nor to the specific embodiment disclosed, but only to the extent set forth in the appended claims.

The improved circuits of the present invention have been further adapted for use in apparatus of the type which scans characters which are printed in accordance with a unique format commonly referred to as the CMC–7 character font. This unique style consists of printing each character, i.e., letters, numbers, and special symbols, in the form of seven vertical bars with six horizontal gaps or spaces between the bars. The horizontal distance between the trailing of one bar and the trailing edge of the next succeeding bar is referred to as an interval. Each interval is one or the other of two predetermined horizontal widths, i.e., three-tenths millimeter or five-tenths millimeter. The six intervals of each character include four short intervals and two long intervals. The apparatus recognizes each character by measuring the intervals and decoding the short and long intervals in accordance with the time sequence in which they are sensed. Hence the intervals provide a two-out-of-six code.

The vertical configuration of the character bars does not affect the decoding apparatus, as a result of which each vertical bar is shaped so as to permit visual recognition of the identity of each character. More particularly, the vertical height of each bar will vary substantially and many of the vertical bars will have two or more sections separated by vertical gaps.

The recognition logic responds only to the fact that there is a vertical bar in a specific horizontal position, whereby the segmenting of the bars does not have any affect.

It will be appreciated that the above-described type of character font gives rise to signal levels at the output of the read head which vary substantially in amplitude. In a typical application, maximum and minimum voltage levels are frequently in the order of three-tenths millivolt and sixteen millivolts, respectively. This is the minimum to maximum signal ratio in the order of about one to fifty-four.

The output from the read head depends on several variable factors. The most important are:

(1) The length of the bars.
(2) The skew of the characters in comparison to the write and read heads.
(3) The embossment of the front of the document.
(4) The thickness of the ink.
(5) The quality of the ink.
(6) Voids in the character.
(7) Contact between the paper and the read head (air gap).
(8) The quality of the paper on which the character has been printed.
(9) The printing mechanism.
(10) Spots and extraneous ink.
(11) The character embossment.

In order to assure optimum operation of the recognition logic circuits, it is desirable to minimize this minimum to maximum signal ratio, for example, to a ratio in the order of one to six.

Accordingly, it is a primary object of the present invention to provide in character recognition apparatus improved means responsive to signals produced by a read head for producing output signals, the relative amplitudes of which are made more uniform.

One requirement is that the improved signal compression means be extremely rapid. Further, the rapid response to changes in the degree of compression must not distort the signals being compressed. It is important that no phase shift is introduced and that the reference level about which the signals swing is not shifted.

Accordingly, it is an important object of the present invention to provide an improved signal compression circuit in which rapid changes in the compression level do not introduce substantial noise, phase shift, reference level shift or distortion into the signals being compressed.

These objects are achieved in one preferred embodiment of the present invention by means of an improved variable gain amplifier having an improved gain level control circuit, the timing of which is controlled by the recognition logic circuits. The improved variable gain amplifier is characterized by a transistor amplifier having an input circuit which includes a shunt impedance comprising a common emitter transistor amplifier, the collector-to-emitter impedance of which forms the variable impedance of the input circuit. The collector-to-emitter impedance is controlled by the level of a gain control voltage applied to the base electrode of the shunt transistor. A nonlinear base input circuit for the shunt transistor substantially compensates for the inherent nonlinear voltage-current characteristic of the transistor base-emitter junction, as well as the offset voltage of the base-emitter diode, whereby the shunt impedance varies substantially linearly with the input gain control voltage.

In operating the shunt transistor as a variable impedance, the collector electrode is isolated from direct-current voltage supplies and the base-emitter junction is operated at low current-voltage levels.

The improved gain level control circuit is characterized by first and second capacitors which are normally isolated from each other. While the first capacitor is being charged in accordance with the total energy content of the signals produced by the read head in scanning one complete character or symbol, the second capacitor has a charge, the value of which corresponds to the energy content of signals produced in response to the next preceding character which was scanned. This latter charge is applied to the shunt transistor to control the gain of the variable gain amplifier. At desired intervals, the second capacitor is discharged; then it is charged to a value corresponding to the value of the charge on the first capacitor. The capacitors are again isolated from each other, and the first capacitor is discharged in preparation for the scanning of the next succeeding character. The voltages across the capacitors are substantially a linear function of the amplitudes of the data signals which they integrate.

A delay line applies signals from the output of the read head to the variable gain amplifier only after the gain level control circuit has integrated the total energy of said signals in the first capacitor and transferred the charge to the second capacitor for control of the variable gain amplifier at a gain level which is inversely proportional to the total energy content of the data signals for that character.

Accordingly, it is another important object of the present invention to provide an improved variable gain amplifier characterized by a shunt connected transistor amplifier, the collector-to-emitter impedance of which varies substantially linearly as a function of the input control signal level.

It is another important object of the present invention to provide an improved circuit characterized by a first integrating capacitor, a second capacitor for receiving and storing a charge corresponding to that on the first capacitor, and improved means for alternatively isolating the capacitors from each other or coupling the capacitors to each other for a transfer of charge.

The foregoing and other objects, features and advantages of the invention will be apparent from the following more particular description of preferred emobdiments of the invention, as illustrated in the accompanying drawings.

Figure 1:
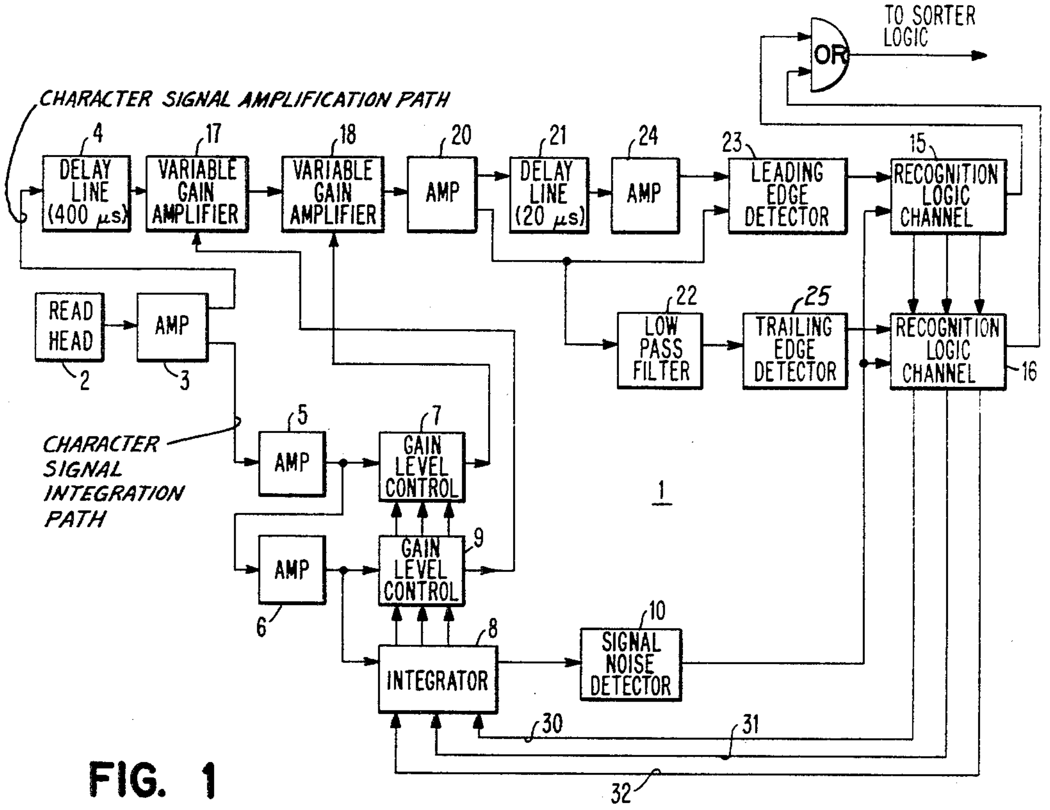
FIG. 1 illustrates, diagrammatically, character recognition apparatus incorporating the improved combination of the present application.

The diagrammatic illustration of FIG. 1 shows a preferred form of the character recognition apparatus 1. The apparatus 1 includes a read head 2 of conventional construction which responds to printed characters to produce output signals. The output signals are applied to a first amplifier 3 which applies the signals to a delay line 4 and to a second amplifier 5.

The output of the second amplifier 5 is applied to a third amplifier 6, and to a first gain level control circuit 7. The output of the amplifier 6 is applied to a second gain level control circuit 9 and to an integrator 8. In the preferred embodiment, the integrator 8 and the control circuits 7 and 9 are of similar construction. The output of the integrator circuit 8 is connected to a signal-noise discriminator 10 which is in turn connected to a pair of recognition logic channels 15 and 16.

The output of the delay line 4 is applied to a first variable gain amplifier 17, the output of which is in turn coupled to the input of a second input variable gain amplifier 18. The gain of the amplifiers 17 and 18 is controlled by the circuits 9 and 7, respectively.

The output of the variable gain amplifier 18 is coupled to an amplifier 20. The output of the amplifier 20 is coupled to a delay line 21, a low pass filter 22, and a leading edge detector circuit 23. The output of the delay line 21 is connected to an amplifier 24, the output of which is coupled to the detector circuit 23. The detector 23 is coupled to a second input to the recognition logic circuit 15.

The output of the low pass filter 22 is connected to a trailing edge detector circuit 25, the output of which is connected to a second input to the recognition logic circuit 16. The outputs of the recognition logic circuits 15 and 16 are applied to the logic circuits (not shown) of a document sorter with which the recognition logic circuits are associated.

During the operation of the recognition apparatus 1, documents are fed through the apparatus past the read head. Because the magnetic ink is not inherently magnetized, the document is moved past a write head (not shown) prior to reading; and a direct-current voltage applied to the write head magnetizes the vertical bars formed by the magnetic ink. As the magnetized bars pass the read head, the variable flux in the read head is converted to a voltage closely resembling a sine wave signal; and this signal is applied to the circuits 3, 5 and 6 for amplification.

Assume for purposes of illustration that the peak-to-peak amplitudes of the output data signals from the read head vary between approximately three-tenths millivolt and sixteen millivolts. These signals are applied to the amplifier 17 at levels in the order of from five and three-tenths millivolts to two hundred and ninety millivolts. The gain of the amplifiers 3 and 5 is selected in a preferred form so as to produce signal levels at the output of the amplifier 5 ranging from one hundred-seventy millivolts to fifteen volts. The gain of the amplifier 6 is selected in the preferred form to be approximately three, whereby its output will range from approximately five hundred-ten millivolts to a clipped maximum amplitude of eighteen volts.

The signals produced by the seven vertical bars for each character or symbol are applied by the amplifier 5 to the gain level control circuit 7 and by the amplifier 6 to the gain level control circuit 9. These signals are integrated by the circuits 7 and 9.

These signals are also applied by the amplifier 3 to the delay line 4. In a preferred embodiment, the line 4 will delay the signals four hundred microseconds, whereas the time required to sense a complete character is in the order of three hundred-thirty microseconds. By the time that the first bar of the character reaches the variable gain amplifier 17, the gain level control circuit 9 will have integrated the seven signals to control the gain of the amplifier 17. Similarly, the circuit 7 will control the gain of the second variable gain amplifier 18 in accordance with the integrated signals during the time period that the signals are being amplified by the circuit 18.

The attenuation of lower level signals is controlled to the greatest extent by the control circuit 9 and the amplifier 17 because the integrated signals are amplified to a greater extent than they are when applied to the control circuit 7. The control circuit 7 and the amplifier 18 provide the primary attenuation of the large amplitude signals which are in excess of the capabilities of the control circuit 9 due to its clipping action. It will be appreciated, however, that the gain levels set by both circuits 7 and 9 contribute jointly to the composite gain of the two stages 17 and 18 to produce optimum results.

The output of the amplifier 6 is also applied to the integrator circuit 8, which in the preferred embodiment is similar to control circuits 7 and 9. The discriminator 10 renders the recognition logic circuits 15 and 16 effective when the output of the integrator circuit 8 exceeds a preset data threshold level which assures the presence of data rather than noise.

In a typical embodiment, the input signals to the first amplifier 17 vary in amplitude by ratios as high as one to fifty-four. The amplifiers 17 and 18 under the control of the circuits 7 and 9 provide a maximum reduction in ratio of three each, or a total of nine, whereby the output signals from the amplifier 18 will have a maximum amplitude variation of the order of six to one. Greater signal compression is avoided to prevent excessive compression of the lowest level data signals in a character group.

The compressed signals are applied to the amplifier 20 which in turn applies the signals A (FIG. *5c*) directly to the leading edge detector 23 and the same signals B (FIG. *5c*) to another input of the detector after a twenty microsecond delay by way of the delay line 21 and the amplifier 24. The detector 23 produces an output pulse D (FIG. *5c*) for each bar signal, the leading edge of which in the preferred embodiment occurs when the input signal B rises to a value slightly greater than half its maximum amplitude. The detector output pulses are applied to the recognition logic circuit 15. In the logic circuit 15 the long and short intervals determined by the seven bars of each character will be analyzed to determine which character or symbol has been scanned.

The output signals A of the amplifier 20 are also applied to a trailing edge detector 25 by way of the low pass filter 22 which rejects signals having a frequency greater than twenty-eight kilocycles. These rejected signals are often developed by ink irregularities on the positive trailing edge of the bar signals. The detector 25 produces an output pulse C (FIG. *5c*) for each bar signal, the leading edge of which occurs when the positive trailing edge of the bar signal falls to an amplitude equal to half of its maximum peak positive amplitude. The relationship between the input and output signals of the detectors 23 and 25 is illustrated in FIG. *5c*.

The output signals from the detector 25 are applied to the recognition logic circuit 16. In the preferred embodiment, the logic circuits 15 and 16 are identical; and each makes a determination of the identity of the character or symbol which has been scanned. The determinations made by the logic circuits 15 and 16 are compared to assure correct identification of the scanned character or symbol.

The operation of circuits 7, 8 and 9 is controlled by timing pulses of three lines 30, 31 and 32 coming from the logic circuit 16. The relative timing of the leading and trailing edges of these control signals and their time duration are illustrated in FIGS. *5a* and *5b* and will be described with respect to the gain level control circuit of FIG. 2.

The details of the recognition logic circuits 15 and 16 and the circuits 20–24 inclusive, are not necessary to an understanding of the invention of the present application and are given merely by way of example to show a typical environment within which the improved combination of the present application can be used. Other amplifying, detecting and recognition logic arrangements can be utilized.

The details of the improved gain level control circuit 9 and the improved variable gain amplifier 17 will now be described in detail.

Figure 2:
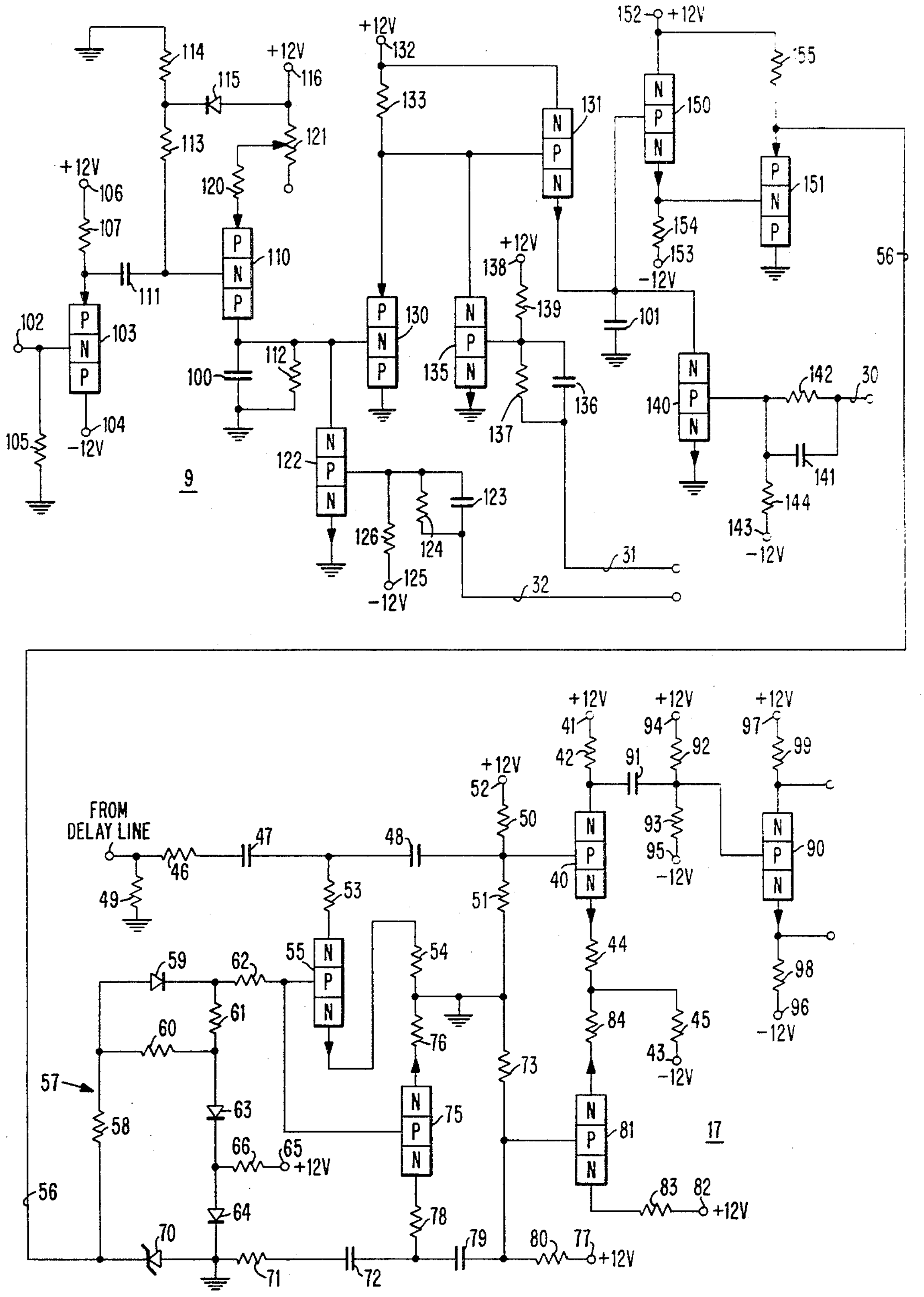
FIG. 2 is a schematic diagram of one form of the variable gain amplifier and a preferred embodiment of the gain level control circuit of the present application.
Figure 5A:
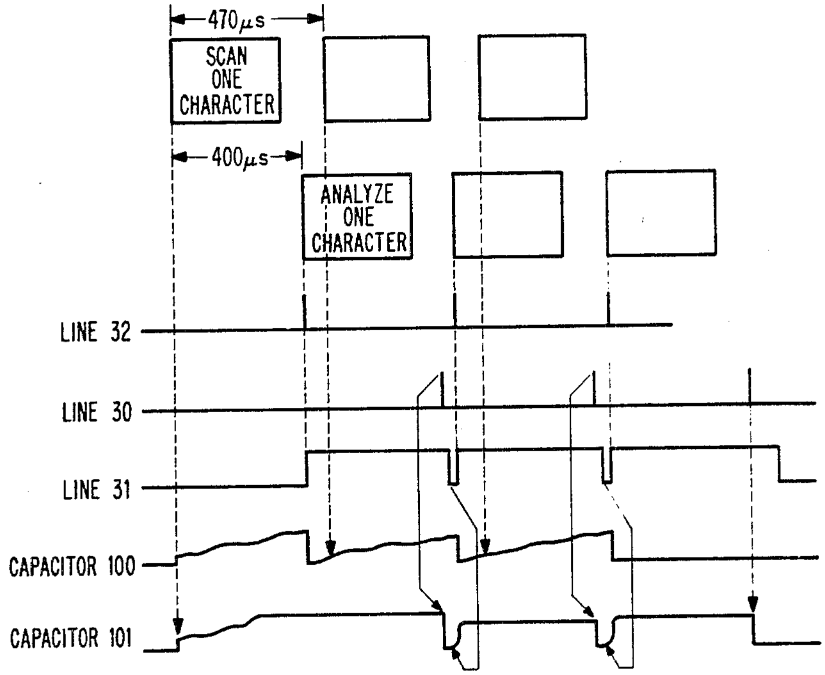
Figure 5B:
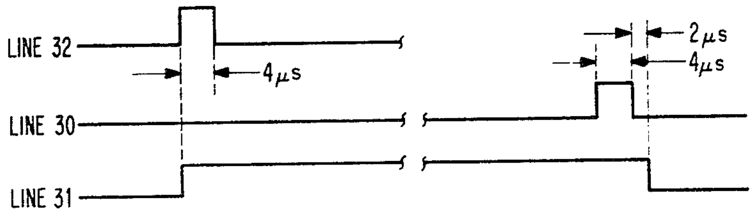
Figure 5C:
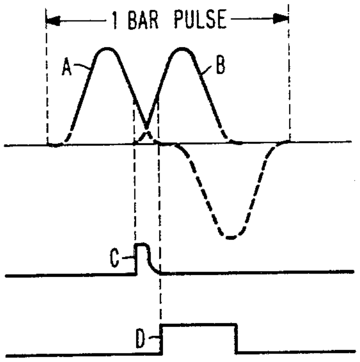
Figure 4:
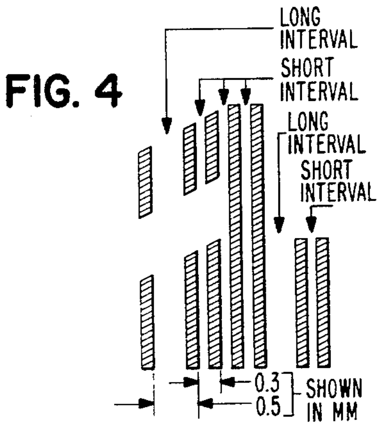
FIG. 4 illustrates one character, i.e. the numeral one, of the unique character font for which the present apparatus has been particularly adapted; and FIGS. *5a*, *5b* and *5c* show certain of the waveforms produced at various junctions in the apparatus for the purpose of better illustrating the operation.

The amplifier 17 shown in detail in FIG. 2 includes an input signal transistor amplifier 40 having its collector electrode connected to a positive supply terminal 41 by way of a resistor 42 and having an emitter electrode connected to a negative supply terminal 43 by way of resistors 44 and 45. The base electrode is coupled to the output of the delay line 4 (FIG. 1) by way of a resistor 46 and capacitors 47 and 48. A resistor 49 connects the output of the delay line to ground potentital for impedance matching, and this resistor is not included in the corresponding circuit for the amplifier 18. The base electrode is also connected to a voltage divider including a pair of resistors 50 and 51 connected between ground potential and a positive supply terminal 52.

The junction between the capacitors 47 and 48 is connected to ground potential by way of a variable impedance, signal attenuating circuit comprising a pair of resistors 53 and 54 connected respectively to the collector and emitter electrodes of a transistor 55 which is operated as a variable impedance in accordance with the voltage level of signals received from the gain level control circuit 9 by way of a conductor 56.

The impedance of the amplifier 55 would normally vary nonlinearly with respect to voltages applied to the base thereof; and therefore, a compensating circuit 57 is provided between the control input line 56 and the base electrode to cause the amplifier 55 to vary its impedance linearly with respect to the input voltage level on the line 56. This will be described in greater detail below.

The compensating circuit 57 includes a series circuit comprising a resistor 58, a diode 59 connected in parallel with a pair of resistors 60 and 61, and a resistor 62. The junction between the resistors 60 and 61 is connected to ground potential by way of series-connected diodes 63 and 64, and the junction between the diodes is connected to a positive supply terminal 65 by way of a resistor 66. A Zener diode 70 connects the input control line 56 to ground potential for limiting the positive level of input control signal to the reverse breakdown voltage of the Zener diode.

Rapid positive and negative changes in the control signal level on the line 56, which rapidly vary the impedance of the amplifier 55, cause transients to be produced across the resistors 53 and 54, and these transients appear as noise at the base input of the transistor amplifier 40.

Means forming a symmetrical channel are provided for cancellation of the transition signal. This means includes a second transistor 75 having its base electrode connected directly to the base electrode of amplifier 55, having its emitter electrode conected to ground potential by way of a resistor 76 and having its collector electrode connected to a resistor 78. The resistor 78 is connected to the junction between a pair of capacitors 72 and 79. The base electrode of a transistor 81 is connected to a resistor 80 which returns to a positive voltage terminal 77, and to the capacitor 79. The capacitor 72 is connected to a resistor 71 which is returned to ground potential.

The transistor 81 has its collector electrode connected to a positive supply terminal 82 by way of a resistor 83 and has its emitter electrode connected to the negative supply terminal 43 by way of a resistor 84 and the resistor 45.

The collector networks of the transistors 55 and 75 are dynamically equivalent, providing identical transition signals at base electrodes of the transistors 40 and 81. Transistors 40 and 81 coact to provide a differential amplifier. Identical signals on bases of transistors 40 and 81 assure that no net current change occurs in either transistor, the currents being supplied by the constant current source provided by the negative supply terminal 43 and the resistor 45. Thus, common mode transients produced by the gain control signal are rejected.

The collector electrode of the signal amplifier 40 is coupled to the base electrode of a transistor amplifier 90 by means of a capacitor 91. The base electrode of the transistor amplifier 90 is connected to the junction between a pair of bias resistors 92 and 93 which form a voltage divider between positive and negative supply terminals 94 and 95. The emitter and collector electrodes of the amplifier 90 are connected to negative and positive supply terminals 96 and 97 by means of resistors 98 and 99. Out-of-phase output signals are derived from the emitter and collector electrodes of the amplifier 90.

Figure 3:
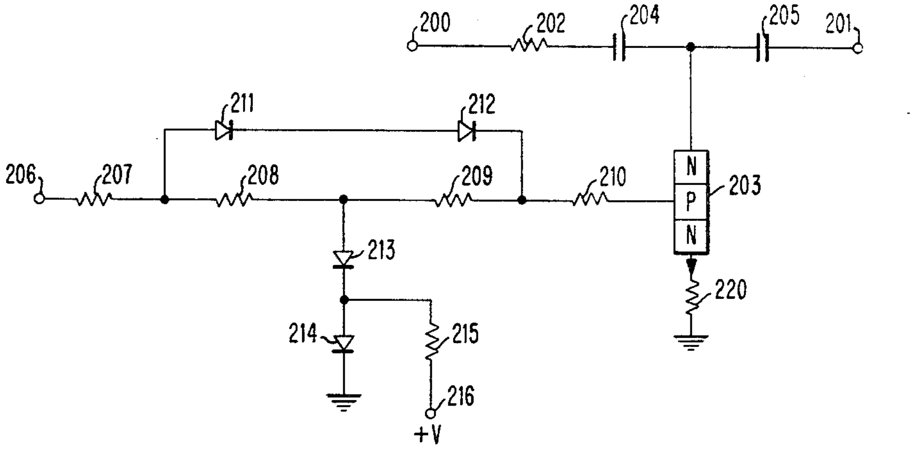
FIG. 3 is a schematic diagram of another form of the improved linear transistor shunt circuit of the present application.

The gain level control circuit 9 of FIG. 2 includes a first capacitor 100 which integrates the seven bar signals of each character and a second capacitor 101 which is set in accordance with the integrated charge of the capacitor 100 to control the gain of the amplifier 17 of FIG. 3 when the corresponding bar signals are amplified by the amplifier 17.

The bar signals received from the amplifier 6 (FIG. 1) are applied to an input terminal 102 (FIG.2) of an emitter follower 103. The collector electrode of the emitter follower is connected to a negative supply terminal 104, its base electrode is connected to ground potential by way of a resistor 105, and its emitter electrode is connected to a positive supply terminal 106 by way of a resistor 107.

The emitter electrode of the emitter follower 103 is coupled to the base electrode of a transistor inverter 110 by means of a capacitor 111. The collector electrode of the inverter 110 is connected to ground potential by way of the integrating capacitor 100 and a shunt resistor 112. The base electrode of the inverter 110 is connected to a bias circuit comprising a pair of resistors 113 and 114 and a diode 115 which connects the junction between the resistors 113 and 114 to a positive supply terminal 116. The emitter electrode of the inverter 110 is connected to the supply terminal 116 by way of a resistor 120 and a potentiometer 121.

The collector electrode of the inverter 110 is connected to the collector electrode of a grounded emitter transistor amplifier 122. The amplifier 122 discharges the integrating capacitor 100 when it is turned on. The base electrode of the transistor amplifier 122 is connected to the input control line 32 (FIG. 1) by way of a capacitor 123 and a resistor 124. The base electrode of the amplifier 122 is connected to a negative supply terminal 125 by way of a resistor 126.

The integrating capacitor 100 is coupled to the gain level control capacitor 101 by means of first and second emitter followers 130 and 131. The collector electrode of the emitter follower 130 is connected to ground potential and its emitter electrode is connected to a positive supply terminal 132 by means of a resistor 133. The base electrode of the emitter follower 131 is connected directly to the emitter electrode of the emitter follower 130, its collector electrode is connected to the supply terminal 132, and its emitter electrode is connected directly to the control capacitor 101.

A grounded emitter transistor amplifier 140 has its collector electrode connected directly to the junction between the emitter and base electrodes of the emitter followers 130 and 131, respectively, to isolate the emitter followers from each other and thereby isolate the capacitors 100 and 101 from each other when the amplifier 135 is turned on to saturation. The base electrode of the amplifier 135 is coupled to the control line 31 (FIG. 1) by means of a parallel-connected coupling capacitor 136 and a resistor 137. The base electrode of the amplifier 135 is also connected to a positive supply terminal 138 by way of a resistor 139.

A grounded emitter transistor amplifier 140 has its collector electrode connected to the capacitor 101 for the purpose of discharging the capacitor 101 when the amplifier 140 is turned on to saturation. The base electrode of the amplifier 140 is connected to the control line 30 (FIG. 1) by means of a parallel-connected coupling capacitor 141 and resistor 142. The base electrode of the amplifier 140 is connected to a negative supply terminal 143 by means of a resistor 144.

The capacitor 101 is connected to the input gain control line 56 of the variable gain amplifier 17 by way of a pair of emitter followers 150 and 151. The base electrode of the emitter follower 150 is connected to the capacitor 101, its collector electrode is connected to a positive supply terminal 152, and its emitter electrode is connected to a negative supply terminal 153 by way of a resistor 154. The emitter electrode is also connected to the base electrode of the emitter follower 151. The collector electrode of the emitter follower 151 is connected to ground potential and its emitter electrode is connected to the line 56 and also to the positive supply terminal 152 by way of a resistor 155.

The operation of the control circuit 9 and the variable gain amplifier 17 will now be described in detail. The operation of the control circuit 9 will be described first since it must in turn control the gain level of the amplifier

17. Reference is first directed to the waveforms of FIGS. *5a* and *5b* which illustrate the timing of circuit 9.

It can be seen from FIGS. *5a* and *5b* that when the first bar signal of a character is detected by the recognition logic circuits (that is, after approximately a four hundred microsecond delay), a four microsecond positive-going pulse is produced on the control line 32 for the purpose of discharging the integrating capacitor 100 preparatory to the scanning of the next character and the integrating of its bar signals.

Shortly after the scanning of a complete character, a positive-going pulse of a four microsecond duration is applied to the control line 30 to cause the discharge of the capacitor 101 preparatory to the transfer of a new charge from the integrating capacitor 100 to the control capacitor 101 for the bar signals of the next character to be passed through the amplifier 17.

Two microseconds after the termination of the pulse on the control line 30, the potential on the control line 31 goes negative until the first bar signal of the next character is received, that is, the time at which the potential on the line 32 goes positive.

It will be appreciated that this timing arrangement is given by way of example and that various arrangements may be had. The only requirement is that the capacitor 100 be discharged preparatory to the integration of the bar signals of a next succeeding character; that, before the discharge of the capacitor 100, the charge thereon be transferred to the control capacitor 101; and that, prior to the transfer of said charge, the preceding charge on the capacitor 101 be discharged. These three steps must occur subsequent to the scanning of a character and prior to the application of the signals of said character to the variable gain amplifier 17.

It will be further noted from FIGS. *5a* and *5b* that the potential on the conductor 31 does not go from its negative to its normally positive state until after the detection of the first character of a group of characters which is scanned. This is provided in the preferred embodiment because of certain requirements of the system not pertinent to the present invention.

With no bar signals applied to the input terminal 102 of the control circuit 9, the emitter follower 103 operates in the linear region. The transistor amplifier 110 is turned off; however, the base and emitter bias circuits cause the base-emitter junction to be biased very close to the onset of conduction, whereby even the slightest negative increase in base input potential will cause it to go rapidly into conduction. Thus it is at its turn-on threshold. This threshold is set primarily by means of the diode 115 which is a germanium diode while the transistor 110 is a silicon device. The voltage differential remains relatively constant over the temperature range of interest.

It will be assumed that the capacitor 100 is completely discharged and that the transistor 135 is turned on to isolate the emitter followers 130 and 131 and to cause the emitter followers to be essentially nonconducting. The transistors 122 and 140 are cut off and the charge on the capacitor 101 is controlling the gain level of the amplifier 17 via the emitter followers 150 and 151.

The positive and negative half cycles of the first bar signal are applied to the input terminal 102 and will produce a corresponding signal at the emitter electrode of the emitter follower 103. The negative half cycle will turn the transistor amplifier 110 on, thereby charging the capacitor 100 to a level which is proportional to the maximum amplitude of the half cycle and the setting of the rheostat 121.

The positive half cycle of the data bar signal is rejected by the transistor 110 which remains in its cut off state.

Similarly, the next six bar signals of the character turn the transistor 110 on during their negative half cycles to further charge the capacitor 100.

Discharge of the capacitor by way of the resistor 112 is partially compensated by the base current of the transistor 130 during the first character recognition cycle when transistor 135 is turned off and capacitors 100 and 101 are at the same level. The base leakage current of the transistors 122 and 130 assures that the charge on the capacitor 100 can only be decreasing. When the transistor 135 is on and turns the transistor 130 off, it prevents a positive buildup across the capacitor 100.

Shortly after the capacitor is charged in accordance with the seven bar signals, a positive pulse is applied to the control line 30 turning on the transistor amplifier 140 to discharge the capacitor 101. This, of course, occurs subsequent to the amplification of the bar signals of the preceding character by the amplifier 17. The transistor 140 then turns off, and two microseconds later the control line 31 goes negative to turn off the transistor 135. The charge on the capacitor 100 is now applied to the base electrode of the emitter follower 130.

At the same time, the emitter follower 131 is turned on, base current being supplied via the terminal 132 and the resistor 133. As the capacitor 101 charges positively, the base-emitter junction of the transistor 130 clamps the base electrode of transistor 131 at a voltage equal to the charge on the capacitor 100 plus the base-emitter voltage drop. Initially, the base-emitter junction of the transistor 130 is substantially nonconducting. As the voltage across the capacitor 101 approaches the voltage across the capacitor 100, the transistor 130 begins to conduct; and the voltage across the capacitor 101 is limited to that across the capacitor 100.

More particularly, the voltage at the emitter electrode of the transistor 130 will reach a value equal to the voltage across the capacitor 100 les the base-emitter drop of the emitter follower 130. This voltage appears at the base electrode of the emitter follower 131 to produce at the emitter electrode thereof a voltage which is more negative than the base electrode voltage by an amount equal to the base-emitter drop of the emitter follower 131. In the preferred embodiment, equal and opposite base-emitter voltage drops are desired; hence, the transistors in the emitter followers 130 and 131 are selected with closely matched characteristics. Thus the capacitor 101 will be charged exactly to the voltage level on the capacitor 100.

An important advantage of this charge transfer technique is that substantially no charge on the capacitor 100 is lost during its transfer to the capacitor 101. Conventional electronic switches on the other hand, have a dynamic impedance which results in a charge loss, and also they have an offset voltage drop from collector to emitter.

Using switched emitter followers in the conventional manner results in charge loss since some of the base current is supplied by the capacitor.

However, in the present embodiment the capacitor 101 is charged via the terminal 132 and the emitter follower 131, the emitter follower 130 being held substantially nonconductive during the charge time of the capacitor 101.

After the capacitor 101 is charged, the voltage on the control line 31 again goes positive, turning on the transistor amplifier 135 to isolate the emitter followers 130 and 131. Shortly thereafter, a four microsecond positive pulse is applied to the control line 32, turning on the transistor amplifier 122 to discharge the capacitor 100.

The control circuit 9 is now ready to receive and integrate the seven bar signals of the next succeeding character. Also, the level in the capacitor 101 is now set at the desired value for controlling the gain of the amplifier 17.

It is noted that the voltage appearing at the emitter electrode of the emitter follower 150 is that of the voltage across the capacitor 101 minus the base-emitter junction drop of the emitter follower 150. Also, the potential on the control line 56 is that of the emitter electrode of the emitter follower 150 plus the base-emitter voltage drop of the emitter follower 151. If the transistors of the emitter followers 150 and 151 are selected so as to have closely matched characteristics, the voltage on the line 56 will be equal to the voltage across the capacitor 101.

The control voltage on the line 56 is positive with respect to ground. In the preferred embodiment, the positive level on the line 56 is limited to three volts by the Zener diode 70. Thus a potential somewhere between ground and plus three volts is applied to the compensating circuit 57 for application to the amplifier 55 to operate the latter as a variable impedance.

The general concept of operating a transistor as a variable impedance for signal attenuation is set forth in an article by Fred Susi, entitled "Solving the AGC Dilemma," appearing in the July 19, 1963 publication of Electronics.

Briefly, the collector electrode is isolated from direct-current voltage supplies. Signals which are to be attenuated, are applied to a voltage divider including an input series resistance and the emitter-collector circuit of the transistor. Output signals are taken across the emitter-collector circuit. Input and output terminals are capacitively coupled to the collector electrode.

This basic arrangement is illustrated in FIG. 3 by input and output terminals 200 and 201, a series resistance 202, a transistor 203 and coupling capacitors 204 and 205.

With the collector electrode isolated from direct sources, each base current level defines a different impedance value between the emitter-collector terminals. So long as the signals which are capacitively coupled to the collector electrode do not exceed a maximum peak-to-peak value which is extremely low, the resistance exhibited between the emitter-to-collector terminals will remain substantially constant, thereby assuring substantially linear attenuation, whereby the output signals are not distorted.

This maximum peak-to-peak collector voltage should be maintained below one hundred millivolts and preferably to about twenty or thirty millivolts to minimize distortion.

It will be recalled that the gain control circuit 9 of FIG. 2 produces a control voltage which varies between zero and approximately plus three volts. This voltage is substantially a linear function of the amplitudes of the bar signals which are to be attenuated. Hence, it is desirable to provide attenuation which is substantially a linear function of the control voltage.

This requires a transistor resistance which is substantially an inverse linear function of the input control voltage. However, over an input range of three volts applied to the base electrode, the base current varies exponentially. This results in an exponential variation in transistor impedance.

To compensate for this nonlinear characteristic, a nonlinear impedance network is interposed between the input control voltage terminal 206 and the base electrode of the transistor.

The description will be directed first to the embodiment of FIG. 3 and then to that of FIG. 2.

The nonlinear impedance network in FIG. 3 includes series-connected resistors 207–210 inclusive, diodes 211 and 212 which are connected in parallel with the resistors 208 and 209, diodes 213 and 214 which are connected between ground potential and the junction between the resistors 208 and 209, and a resistor 215 which connects the junction between the diodes 213 and 214 to a positive supply terminal 216.

The resistor 215 is selected to produce through the diode 214 a current which produces a voltage drop across the diode which voltage drop is close to, but below the threshold voltage at which the base-emitter junction of the transistor 203 begins to exhibit significant base current. This voltage current reverse biases the diode 213.

A diode is used in place of a resistor voltage divider to provide thermal tracking with the base-emitter voltage to assure a reasonably constant threshold level. A silicon transistor 203 is used in order to minimize variations in the compression ratio in response to variations in the ambient temperature. The compression ratio is a function of the applied collector voltage divided by the transistor impedance, e.g., the collector current $I_c$. The collector current is defined by the equation:

$$I_c = hfe I_b + (hfe+1) I_{co}$$

where:

*hfe* is the current amplification factor,
$I_b$ is the base current, and
$I_{co}$ is the leakage current.

The leakage current is small in silicon transistors so that the term $(hfe+1)I_{co}$ is insignificant, and the compression ratio is determined essentially by the term $(hfe I_b)$.

The resistor 220 makes the circuit less device dependent by providing emitter degeneration.

With zero potential applied to the input terminal 206, the diode 213 is reverse biased by a potential substantially equal to the voltage drop across the diode 214. As the input voltage is increased positively toward this value, the impedance of the diode 213 is extremely high and passes substantially no current. Under these conditions the impedance of the base-emitter junction of the transistor 203 is extremely high and substantially no current flows through the base-emitter junction. The impedance of the transistor 203 is at its highest value to provide minimum attenuation of alternating current signals applied to the input terminal 200.

As the control voltage applied to the terminal 206 is increased beyond the $V_{BE}$ threshold, the transistor 203 begins to conduct. To decrease the rate of base current increase, the shunt network consisting of diodes 213 and 214 comes into play. The shunting action of the diode 213 causes the increase in base current in the transistor 203 to vary substantially linearly with the input voltage until the input voltage reaches a value at which the diode 213 begins to enter into its low impedance region. If it were not for the diodes 211 and 212, the diode 213 would thereafter shunt substantially all additional increases in current in the network as a result of further increases in the input control voltage. This occurs in the preferred embodiment with the component values set forth below at an approximate one and twenty-five hundredths volt input level at terminal 206.

As the shunt network 213, 214 tends to approach this limit, the voltage differential between resistors 207 and 210 tends to forward bias diodes 211 and 212. Further increase in voltage at 206 results in higher forward current through the diodes supplying more base current to the transistor 203. The current through the diodes 211 and 212 increases at a rate sufficient to cause the base current to increase substantially linearly with further increases in control voltage. The voltage-current characteristics of the diodes and the base-emitter junction are such as to produce a reasonably linear variation in base current with variations in control voltage from a value equal to the drop across the diode 214 to approximately three volts. In one embodiment, the maximum base current was about twenty-five microamperes.

The values of the resistors 207–210 can be changed to vary the base current levels. Also, the emitter bias of the transistor 220 can be initially set to cause initial base current at selected control voltage values other than thirty-seven hundredths volt.

A resistor 220 is connected between the emitter electrode and ground potential for the purpose of obviating the need for matching base-emitter impedance characteristics of the transistor 203 from machine to machine. This resistor minimizes the effect of different base-emitter characteristics.

The value of the resistor 210 in the base circuit of the transistor 203 determines to a great extent the slope of the input voltage-base current curve and therefore, the resistance exhibited by the transistor 203 for a given input. The signal attenuating circuit of FIG. 2 is similar to that of FIG. 3.

The resistor 53 in the embodiment of FIG. 2 is included to provide some isolation between the collector electrode and the coupling capacitors 47 and 48. In the embodiment of FIG. 2 a single diode 59, rather than a pair of diodes such as 211 and 212, was found to give satisfactory operation.

As indicated above, the configuration of FIG. 2, including the resistors 53 and 54 and the transistor 55 connected in series, give rise to low level transients at the junction between the capacitors 47 and 48 in response to the very rapid changes in voltage across the capacitor 101 when it is discharged and when it is charged again shortly thereafter. The switching times are extremely fast and produce transients with a cycle time in the order of a microsecond. These transients are rejected as described above by the transistor pairs 55, 75 and 40, 81.

Values for certain of the components in FIG. 2 are set forth below by way of example to illustrate an operable device, and corresponding components in FIG. 3 may have similar values. It will be appreciated, however, that other suitable values may be selected by those skilled in the art to suit their particular design objectives without departing from the teachings of the present application.

| Resistors: | Ohms |
|---|---|
| 42, 83 | 5,100 |
| 44, 84 | 475 |
| 45 | 33,000 |
| 46 | 24,000 |
| 49 | 16,000 |
| 50, 80 | 26,100 |
| 51, 73 | 63,400 |
| 53 | 2,000 |
| 54, 76, 98 | 1,000 |
| 58, 78 | 1,800 |
| 60 | 1,500 |
| 61 | 1,300 |
| 62 | 15,000 |
| 66, 126, 144 | 10,000 |
| 71 | 28,300 |
| 92 | 220,000 |
| 93 | 100,000 |
| 99 | 2,400 |
| 105 | 56,000 |
| 107 | 4,700 |
| 112 | 51,000 |
| 113 | 43,000 |
| 114 | 12,000 |
| 120 | 270 |
| 121 | 5,000 |
| 124, 142 | 510 |
| 133 | 22,000 |
| 154, 137 | 30,000 |
| 139 | 62,000 |
| 155 | 3,600 |

| Capacitors: | Microfarads |
|---|---|
| 47, 72 | .068 |
| 48, 79 | .1 |
| 91 | .33 |
| 100, 101 | .047 |
| 111 | .0033 |
| 123, 141 | .0062 |
| 136 | .0001 |

In the preferred embodiments, diodes 63, 64, 213 and 214 are germanium and diodes 59, 211 and 212 are silicon.

Compression ratios in the order of ten or twenty to one can be achieved by suitable selection of the resistor values in the nonlinear impedance input to the shunting transistors 55 and 203 of FIGS. 2 and 3.

It will be appreciated that the control voltage for the shunt transistors 55, 75 and 203 can be determined by integrating a selected one (or few) of the character signals. This is accomplished by using a transistor clamp (not shown) to hold the transistor 110 off except when the selected signal is received.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In character recognition apparatus of the type in which means are provided for scanning each character and producing signals corresponding to incremental portions thereof, and in which recognition logic circuits respond to the signals for determining the identity of the scanned character, in combination with the signal producing means, means for compressing the ratio of the minimum to maximum signal amplitudes comprising:

first means responsive to the signals produced in response to the scanning of a complete character for producing a gain control voltage the value of which is a function of the signal amplitudes;

a delay line reproducing at its output the signals of the complete character subsequent to the producing of the gain control voltage for the complete character;

second means for storing said gain control voltage while the signals of the complete character are reproduced at the delay line output;

third means for transferring the gain control voltage from said first to said second means subsequent to the scanning of the complete character and prior to the reproduction at the delay line output of the signals for the complete character; and a variable gain amplifier amplifying the signals of said complete character at a gain level which is an inverse function of the value of said gain control voltage including:

an input circuit having a resistor and a pair of capacitors connected in series for coupling the signals from the delay line output to the amplifier;

a common emitter transistor amplifier having a collector electrode isolated from direct-current voltage supplies and connected to the junction between the capacitors and having an emitter electrode connected to a reference supply to shunt signals from the variable gain amplifier as an inverse function of its collector-to-emitter impedance; and means coupled to said second means and operating the common emitter amplifier so that its collector-to-emitter impedance varies substantially as an inverse linear function of the gain control voltage level.

2. In character recognition apparatus of the type in which means are provided for scanning each character and producing signals corresponding to incremental portions thereof, and in which recognition logic circuits respond to the signals for determining the identity of the scanned character, in combination with the signal producing means, means for comprising the ratio of the minimum to maximum signal amplitudes comprising:

means responsive to the signals produced in response to the scanning of a complete character for producing a control voltage the value of which is a function of the signal amplitudes;

a delay line reproducing at its output the signals of the complete character subsequent to the producing of the control voltage for the complete character; and a variable gain amplifier amplifying the signals of said complete character at a gain level which is an inverse function of the value of said control voltage including:

an input circuit having a resistor and a pair of capacitors connected in series for coupling the signals from the delay line output to the amplifier;

a common emitter transistor amplifier having a collector electrode isolated from direct-current voltage supplies and connected to the junction between the capacitors and having an emitter electrode connected to a reference supply to shunt signals from the variable gain amplifier as an inverse function of its collector-to-emitter impedance; and means operating the common emitter amplifier so that its collector-to-emitter impedance varies substantially as an inverse function of the control voltage level;

said means for producing the control voltage including:

means including a third capacitor for integrating the signals of a complete character;

a fourth capacitor for storing the control voltage produced for one character while the third capacitor is integrating signals for the next succeeding character;

a first pair of cascade-connected emitter followers having transistors of opposite conductivity types coupling the third capacitor to the fourth capacitor to charge the latter to a voltage equal to that across the former;

a common emitter transistor switch having its collector electrode connected to the emitter followers for rendering the latter nonconducting to isolate the third and fourth capacitors from each other while character signals are being scanned and amplified; and a second pair of cascade-connected emitter followers having transistors of opposite conductivity types coupling the fourth capacitor to the means for operating the common emitter amplifier.

3. In character recognition apparatus of the type in which means are provided for scanning each character and producing signals corresponding to incremental portions thereof, and in which recognition logic circuits respond to the signals for determining the identity of the scanned character, in combination with the signal producing means, means for compressing the ratio of the minimum to maximum signal amplitudes comprising:

first means responsive to the signals produced in response to the scanning of a complete character for producing a gain control voltage the value of which is a function of the signal amplitudes;

a delay line reproducing at its output the signals of the complete character subsequent to the producing of the gain control voltage for the complete character;

second means for storing said gain control voltage while the signals of the complete character are reproduced at the delay line output;

third means for transferring the gain control voltage from said first to said second means subsequent to the scanning of the complete character and prior to the reproduction at the delay line output of the signals for the complete character; and a compression circuit including:

an input terminal connected to the output of the delay line;

an output terminal;

a resistor and a pair of capacitors connected in series between the terminals;

a common emitter transistor amplifier having a collector electrode isolated from direct-current voltage supplies and connected to the junction between the capacitors and having an emitter electrode connected to a reference supply to shunt a portion of the signals to the supply as an inverse function of its collector-to-emitter impedance; and means coupled to the second means and operating the common emitter amplifier so that its collector-to-emitter impedance varies substantially as an inverse linear function of the gain control voltage level.

4. In character recognition apparatus of the type in which means are provided for scanning each character and producing signals corresponding to incremental portions thereof, and in which recognition logic circuits respond to the signals for determining the identity of each scanned character, in combination with the signal producing means, means for compressing the ratio of the minimum to maximum signal amplitudes comprising:

an integrator responsive to the signals produced in response to the scanning of a complete character for producing a gain control voltage which is proportional to the sum of the signal amplitudes;

a delay line reproducing at its output the signals of the complete character subsequent to the producing of the gain control voltage for the complete character;

storage means for storing said gain control voltage while the signals of the complete character are reproduced at the delay line output;

means for transferring the gain control voltage from said integrator to said storage means subsequent to the scanning of the complete character and prior to the reproduction at the delay line output of the signal for the complete character; and a variable gain amplifier amplifying the signals of said complete character at a gain level which is inversely proportional to the value of said gain control voltage including:

an input circuit having a resistor and a pair of capacitors connected in series for coupling the signals from the delay line output to the amplifier;

a common emitter transistor amplifier having a base electrode, having a collector electrode isolated from direct-current voltage supplies and connected to the junction between the capacitors, and having an emitter electrode connected to a reference supply to shunt signals from the variable gain amplifier as an inverse function of its collector-to-emitter impedance; and a nonlinear impedance network connecting the storage means to the base electrode and responsive to the gain control voltage to produce a collector-to-emitter impedance varying substantially as an inverse linear function of the control voltage level.

5. In character recognition apparatus of the type in which means are provided for scanning each character and producing signals corresponding to incremental portions thereof, and in which recognition logic circuits respond to the signals for determining the identity of each scanned character, in combination with the signal producing means, means for compressing the ratio of the minimum to maximum signal amplitudes comprising:

means responsive to the signals produced in response to the scanning of a complete character for producing a control voltage the value of which is a function of the signal amplitudes;

a delay line reproducing at its output the signals of the complete character subsequent to the producing of the control voltage for the complete character; and means including a first pair of transistors operated as a variable gain differential amplifier for amplifying the signals of said complete character at a gain level which is an inverse function of the value of said control voltage and including:

an input circuit having a resistor and a pair of capacitors connected in series for coupling the signals from the delay line output to one of said transistors;

an input circuit for the other transistor having a pair of series-connected capacitors;

a second pair of transistors, each operated as a common emitter amplifier, each having a base electrode, a collector electrode isolated from direct-current voltage supplies and connected to the junction between a respective one of the pairs of capacitors, and an emitter electrode connected to a reference supply; and means connected to the base electrodes and operating each common emitter amplifier so that its collector-to-emitter impedance varies substantially as an inverse function of the control voltage level, whereby rapid changes in the control voltage do not affect the output of the differential amplifier.

6. In character recognition apparatus of the type which reads printed characters in the form of a predetermined number of elongated bars separated by spaces each of which is one or the other of two predetermined distances, in which means are provided for scanning the bars in sequence and producing signals corresponding to the bars, and in which recognition logic circuits respond to the relative time intervals between signals for determining the identity of each scanned character, in combination with the signal producing means, means for compressing the ratio of the minimum to maximum signal amplitudes comprising:

first means responsive to the signals produced in response to the scanning of a complete character for producing a gain control voltage the value of which is a function of the signal amplitudes;

a delay line reproducing at its output the signals of the complete character subsequent to the producing of the gain control voltage for the complete character;

second means for storing said gain control voltage while the signals of the complete character are reproduced at the delay line output;

third means for transferring the gain control voltage from said first to said second means subsequent to the scanning of the complete character and prior to the reproduction at the delay line output of the signals for the complete character; and a variable gain amplifier amplifying the signals of said complete character at a gain level which is an inverse function of the value of said gain control voltage including:

an input circuit having a resistor and a pair of capacitors connected in series for coupling the signals from the delay line output to the amplifier;

a common emitter transistor amplifier having a collector electrode isolated from direct-current voltage supplies and connected to the junction between the capacitors and having an emitter electrode connected to a reference supply to shunt signals from the variable gain amplifier as an inverse function of its collector-to-emitter impedance; and means coupled to said second means and operating the common emitter amplifier so that its collector-to-emitter impedance varies substantially as an inverse linear function of the gain control voltage level.

7. In character recognition apparatus of the type which reads printed characters in the form of a predetermined number of elongated bars separated by spaces each of which is one or the other of two predetermined distances, in which means are provided for scanning the bars in sequence and producing signals corresponding to the bars, and in which recognition logic circuits respond to the relative time intervals between signals for determining the identity of each scanned character, in combination with the signal producing means, means for compressing the ratio of the minimum to maximum signal amplitudes comprising:

means responsive to the signals produced in response to the scanning of a complete character for producing a control voltage the value of which is a function of the signal amplitudes;

a delay line reproducing at its output the signals of the complete character subsequent to the producing of the control voltage for the complete character; and a variable gain amplifier amplifying the signals of said complete character at a gain level which is an inverse function of the value of said control voltage including:

an input circuit having a resistor and a pair of capacitors connected in series for coupling the signals from the delay line output to the amplifier;

a common emitter transistor amplifier having a collector electrode isolated from direct-current voltage supplies and connected to the junction between the capacitors and having an emitter electrode connected to a reference supply to shunt signals from the variable gain amplifier as an inverse function of its collector-to-emitter impedance; and means operating the common emitter amplifier so that its collector-to-emitter impedance varies substantially as an inverse function of the control voltage level;

said means for producing the control voltage including:

means including a third capacitor for integrating the signals of a complete character;

a fourth capacitor for storing the control voltage produced for one character while the third capacitor is integrating signals for the next succeeding character;

a first pair of cascade-connected emitter followers having transistors of opposite conductivity types coupling the third capacitor to the fourth capacitor to charge the latter to a voltage equal to that across the former;

a common emitter transistor switch having its collector electrode connected to the emitter followers for rendering the latter nonconducting to isolate the third and fourth capacitors from each other while character signals are being scanned and amplified; and a second pair of cascade-connected emitter followers having transistors of opposite conductivity types coupling the fourth capacitor to the means for operating the common emitter amplifier.

8. In character recognition apparatus of the type which reads printed characters in the form of a predetermined number of elongated bars separated by spaces each of which is one or the other of two predetermined distances, in which means are provided for scanning the bars in sequence and producing signals corresponding to the bars, and in which recognition logic circuits respond to the relative time intervals between signals for determining the identity of each scanned character, in combination with the signal producing means, means for compressing the ratio of the minimum to maximum signal amplitudes comprising:

first means responsive to the signals produced in response to the scanning of a complete character for producing a gain control voltage the value of which is a function of the signal amplitudes;

a delay line reproducing at its output the signals of the complete character subsequent to the producing of the gain control voltage for the complete character;

second means for storing said gain control voltage while the signals of the complete character are reproduced at the delay line output;

third means for transferring the gain control voltage from said first to said second means subsequent to the scanning of the complete character and prior to the reproduction at the delay line output of the signals for the complete character; and a compression circuit including:

an input terminal connected to the output of the delay line, an output terminal;

a resistor and a pair of capacitors connected in series between the terminals;

a common emitter transistor amplifier having a collector electrode isolated from direct-current voltage supplies and connected to the junction between the capacitors and having an emitter electrode connected to a reference supply to shunt a portion of the signals to the supply as an inverse function of its collector-to-emitter impedance; and means coupled to the second means and operating the common emitter amplifier so that its collector-to-emitter impedance varies substantially as an inverse linear function of the gain control voltage level.

9. In character recognition apparatus of the type which reads printed characters in the form of a predetermined number of elongated bars separated by spaces each of which is one or the other of two predetermined distances, in which means are provided for scanning the bars in sequence and producing signals corresponding to the bars, and in which recognition logic circuits respond to the relative time intervals between signals for determining the identity of each scanned character, in combination with the signal producing means, means for compressing the ratio of the minimum to maximum signal amplitudes comprising:

an integrator responsive to the signals produced in response to the scanning of a complete character for producing a gain control voltage which is proportional to the sum of the signal amplitudes;

a delay line reproducing at its output the signals of the complete character subsequent to the producing of the gain control voltage for the complete characters;

storage means for storing said gain control voltage while the signals of the complete character are reproduced at the delay line output;

means for transferring the gain control voltage from said integrator to said storage means subsequent to the scanning of the complete character and prior to the reproduction at the delay line output of the signals for the complete character; and a variable gain amplifier amplifying the signals of said complete character at a gain level which is inversely proportional to the value of said gain control voltage including:

an input circuit having a resistor and a pair of capacitors connected in series for coupling the signals from the delay line output to the amplifier;

a common emitter transistor amplifier having a base electrode, having a collector electrode isolated from direct-current voltage supplies and connected to the junction between the capacitors, and having an emitter electrode connected to a reference supply to shunt signals from the variable gain amplifier as an inverse function of its collector-to-emitter impedance; and a nonlinear impedance network connecting the storage means to the base electrode and responsive to the gain control voltage to produce a collector-to-emitter impedance varying substantially as an inverse linear function of the control voltage level.

10. In character recognition apparatus of the type which reads printed characters in the form of a predetermined number of elongated bars separated by spaces each of which is one or the other of two predetermined distances, in which means are provided for scanning the bars in sequence and producing signals corresponding to the bars, and in which recognition logic circuits respond to the relative time intervals between signals for determining the identity of each scanned character, in combination with the signal producing means, means for compressing the ratio of the minimum to maximum signal amplitudes comprising:

means responsive to the signals produced in response to the scanning of a complete character for produc- a control voltage the value of which is a function of the signal amplitudes;

a delay line reproducing at its output the signals of the complete character subsequent to the producing of the control voltage for the complete character; and means including a first pair of transistors operated as a variable gain differential amplifier for amplifying the the signals of said complete character at a gain level which is an inverse function of the value of said control voltage and including:

an input circuit having a resistor and a pair of capacitors connected in series for coupling the signals from the delay line output to one of said transistors;

an input circuit for the other transistor having a pair of series-connected capacitors;

a second pair of transistors, each operated as a common emitter amplifier, each having a base electrode, a collector electrode isolated from direct-current voltage supplies and connected to the junction between a respective one of the pairs of capacitors, and an emitter electrode connected to a reference supply; and means connected to the base electrodes and operating each common emitter amplifier so that its collector-to-emitter impedance varies substantially as an inverse function of the control voltage level, whereby rapid changes in the control voltage do not affect the output of the differential amplifier.

11. Apparatus for compressing the ratio of the minimum to maximum amplitudes of signals from a source comprising:

means responsive to a selected group of signals for producing a control voltage the value of which is a function of the signal amplitudes;

a delay line reproducing at its output the group of signals after the control voltage is established; and means including a first pair of transistors operated as a variable gain differential amplifier for amplifying the group of signals at a gain level which is an inverse function of the value of said control voltage including:

an input circuit having a resistor and a pair of capacitors connected in series for coupling the signals from the delay line output to one of said transistors;

an input circuit for the other transistor having a pair of series-connected capacitors;

a second pair of transistors, each operated as a common emitter amplifier, each having a base electrode, a collector electrode isolated from direct-current voltage supplies and connected to the junction between a respective one of the pairs of capacitors and having an emitter electrode connected to a reference supply to shunt signals from the variable gain amplifier as an inverse function of its collector-to-emitter impedance; and a nonlinear impedance network connected to the base electrodes and responsive to the control voltage for operating each common emitter amplifier so that its collector-to-emitter impedance varies substantially as an inverse function of the control voltage level, whereby rapid changes in the control voltage do not affect the output of the differential amplifier.

References Cited

UNITED STATES PATENTS

| | | | |
|---|---|---|---|
| 2,930,987 | 3/1960 | Groce | 330—136 |
| 3,109,103 | 10/1963 | Wilhemsen | 328—142 |
| 3,316,536 | 4/1967 | Andrews | 340—146.3 |

OTHER REFERENCES

Susi: Solving the AGC Diemma, Electronics, July 19, 1963, pp. 60–62.

MAYNARD R. WILBUR, Primary Examiner

SOL SHEINBEIN, Assistant Examiner

U.S. Cl. X.R.

307—264; 328—142; 330—136